(12) United States Patent
Lee (10) Patent No.: US 8,761,588 B2
(45) Date of Patent: Jun. 24, 2014

(54) BIDIRECTIONAL HEATING COOKER

(76) Inventor: Jin Hee Lee, Gyeonggi-do (KR)

(*) Notice: Subject to any disclaimer, the term of this patent is extended or adjusted under 35 U.S.C. 154(b) by 369 days.

(21) Appl. No.: 13/147,068

(22) PCT Filed: Jun. 17, 2009

(86) PCT No.: PCT/KR2009/003250
§ 371 (c)(1),
(2), (4) Date: Oct. 25, 2011

(87) PCT Pub. No.: WO2010/087548
PCT Pub. Date: Aug. 5, 2010

(65) Prior Publication Data
US 2012/0033953 A1    Feb. 9, 2012

(30) Foreign Application Priority Data

Jan. 29, 2009  (KR) .................. 10-2009-0006812
May 19, 2009  (KR) .................. 10-2009-0043422

(51) Int. Cl.
*A47J 37/00*  (2006.01)
*A47J 37/06*  (2006.01)

(52) U.S. Cl.
USPC ........... 392/418; 392/411; 392/422; 392/426; 219/385; 99/427; 99/443 R; 99/444

(58) Field of Classification Search
None
See application file for complete search history.

(56) References Cited

U.S. PATENT DOCUMENTS

| | | | | |
|---|---|---|---|---|
| 2,042,855 A | * | 6/1936 | Merklein | 99/422 |
| 2,057,421 A | * | 10/1936 | Dickson | 99/353 |
| 3,204,549 A | * | 9/1965 | Palowsky | 99/391 |
| 3,277,813 A | * | 10/1966 | Luscher | 99/391 |
| 3,552,299 A | * | 1/1971 | Patoka | 99/339 |
| 4,119,834 A | * | 10/1978 | Losch | 392/418 |
| 4,960,977 A | * | 10/1990 | Alden | 219/388 |
| 5,378,872 A | * | 1/1995 | Jovanovic | 219/388 |
| 6,250,210 B1 | * | 6/2001 | Moreth | 99/331 |
| 6,967,036 B1 | * | 11/2005 | Hedrington et al. | 426/466 |
| 7,000,530 B2 | * | 2/2006 | Damrath et al. | 99/427 |
| 2003/0033940 A1 | * | 2/2003 | Damrath et al. | 99/348 |
| 2009/0212044 A1 | * | 8/2009 | Stanton et al. | 219/682 |
| 2010/0209083 A1 | * | 8/2010 | Lee | 392/418 |

FOREIGN PATENT DOCUMENTS

| | | |
|---|---|---|
| JP | 2007-000248 A | 1/2007 |
| KR | 20-314605 Y1 | 5/2003 |
| KR | 10-2006-0132473 A | 12/2006 |
| KR | 10-0669998 B1 | 1/2007 |
| KR | 10-00779225 B1 | 11/2007 |
| KR | 10-833966 B1 | 5/2008 |

* cited by examiner

*Primary Examiner* — Joseph M Pelham
(74) *Attorney, Agent, or Firm* — Kile Park Reed & Houtteman PLLC

(57) ABSTRACT

Provided is a bidirectional heating cooker that supplements and improves a function of a conventional infrared radiation cooker, in which the bidirectional heating cooker further includes a lower heating unit that is placed at the lower end of a cooking pan that is heated by radiant heat irradiated by an infrared lamp and that directly heats the cooking pan, to thereby heat the cooking pan quickly by the lower heating unit to thus make the upper and lower portions of food such as meat put on the cooking pan more quickly roasted than the conventional infrared radiation cooker and reduce a burden of electric charges based on a shortened heating time of the cooking pan, and to thereby make it possible to cook food rapidly by an upper heating unit with the infrared lamp and the lower heating unit that is placed on the cooking pan.

7 Claims, 6 Drawing Sheets

FIG. 6B though they are not continuously turned over, and little amount of smoke or odor is produced during cooking. However, since the supporting pillar is placed at one side of the base stand in the structure of the above-described infrared ray radiation cooker, it is very inconvenient to take food put on the rotating pan at a direction that at least the base stand is placed. Therefore, it is a little inconvenient for several persons who sit around in a restaurant or family for example to use the infrared ray radiation cooker.

BIDIRECTIONAL HEATING COOKER

TECHNICAL FIELD

The present invention relates to a bidirectional heating cooker, and more particularly, to a bidirectional heating cooker having an upper radiation unit that includes a heating unit that is located at a distance from the upper portion of a cooking pan, and grills the upper portions of foods that are put on the cooking pan by radiation heat emitted from the heating unit, and a lower heating unit that is located at the bottom of the cooking pan and directly heats the cooking pan, to thereby heat, cook, grill or roast the foods put on the cooking pan by both the radiation heat emitted from the upper radiation unit and the conduction heat transmitted from the lower heating unit.

BACKGROUND ART

In general, there are conduction, convection and radiation as a heat transfer mechanism. Conduction heat is mainly transferred by solid and convection heat is mainly transferred by fluid. In addition, radiation heat is transferred through a process of discharging energy formed of electromagnetic waves emitted from surface of a certain heating unit, in which heat is emitted at velocity of light even at a state of having no medium and is delivered directly to an object. Wavelength of the radiation heat ranges from an infrared ray region to an ultraviolet ray region whose wavelength is the shortest via a visible ray region. However, in comparison with the visible ray or ultraviolet ray, it has been known that a band of the wavelengths of the infrared rays such as far infrared rays, middle infrared rays, and near infrared rays has the strongest heating function.

Therefore, conventional cooking appliances using infrared rays have been developed in various forms.

One example of an existing infrared ray cooking appliance was disclosed in Korean Patent Registration No. 0779225 published on Nov. 28, 2007. The infrared ray meat grill cooker disclosed in the Korean Patent Registration No. 0779225 includes: an infrared lamp whose outer portion is composed of quartz tubes; a cooking pan that is placed over the infrared lamp; and a reflective board that is placed below the infrared lamp. The infrared ray meat grill cooker employs a uni-direction heating method in which the infrared lamp heats the cooking pan and the cooking pan grills only a lower portion of meat. As a result, the infrared ray meat grill cooker may cause inconveniences that meat must be turn over constantly in order to prevent the meat from being burnt excessively. In addition, a thermal efficiency may fall.

Another example of a cooking appliance developed using infrared ray technology was Korean Utility-model Registration No. 314605 published on May 27, 2003. The meat roaster disclosed in the Korean Utility-model Registration No. 314605 has a near-infrared ray lamp that is positioned at a certain distance over a gridiron grilling pan and a reflective board over the infrared ray lamp. The meat roaster applies near-infrared rays directly onto meat from the above infrared ray lamp and successfully keeps meats from burning. Accordingly, the meat roaster has an advantage that even the inner portion of the meat can be roasted evenly. However, the meat roaster also employs a uni-direction heating method in which the near-infrared rays emitted from the near-infrared ray lamp roasts only a portion of meat, to thereby cause inconveniences that meat must be turn over constantly in order to prevent the meat from being burnt excessively.

Moreover, in the case of these cooking pans using the infrared rays or near-infrared rays, there is a problem that time taken to roast foods put on the cooking pans delays. In addition, since the infrared ray lamps or near-infrared ray lamps should be turned on for a long time in order to heat foods put on the cooking pans, there is also a problem that an expense burden is additionally produced by increase of electric charges.

Meanwhile, still another example of an existing infrared ray cooking appliance was disclosed in Korean Patent Registration No. 833966 registered on May 26, 2008 by the same applicant as that of this application. The infrared ray radiation cooker disclosed in the Korean Patent Registration No. 833966 includes: a base stand at the center of the upper surface of which a shaft hole is formed, and on one side of which a power switch for controlling an electric power supply is formed; a rotating pan which is a circular plate style container which can contain food on the upper surface thereof, and at the center of the lower surface of which a shaft protrusion is formed so as to be detachably inserted into the shaft hole; a supporting pillar which is vertically placed at one side of the base stand; and an infrared ray irradiator which is placed on the upper end of the supporting pillar and which is switched by the power switch, to thus apply infrared rays onto the rotating pan.

The above-described infrared ray radiation cooker employs a bidirectional heating method in which the infrared ray irradiator irradiates infrared rays onto food put on the rotating pan, to thus roast the upper and inner portions of the food and the rotating pan that has been heated by radiant heat of infrared lamps of the infrared ray irradiator roasts the lower portion of the food. In comparison with the conventional uni-directional infrared ray cooker, the above-described infrared ray radiation cooker has advantages that a thermal efficiency is excellent, foods such as meat for roasting can be evenly roasted without excessive burning al In addition, since meat is roasted using radiant heat that is irradiated by the infrared ray irradiator, a time difference occurs in a cooking time taken to roast the upper and lower portions of the meat in which the upper portion of the meat is roasted more quickly than the lower portion of the meat until the rotating pan is heated at an initial time of roasting the meat. Accordingly, although meat can be bidirectionally cooked in the infrared ray radiation cooker, consumers who want to eat roasted meat earlier are inclined to turn over meat in order to make the lower portion of the meat roasted earlier. In addition, in spite of an advantage that the lower rotating pan uses radiant heat induced from the upper heat emission of the existing cooker, consumers who are accustomed to use the conventional upstream heating cooker do not sufficiently use a function of bidirectionally roasting meat by using the upper heat emission and lower radiant heat use mechanism in the conventional bidirectional radiation cooker due to a time difference occurring in a cooking time taken to roast the upper and lower portions of food for an initial time of 1-2 minutes as well as a habitual attitude that is accustomed when using a general cooker of roasting meat.

Further, consumers have habits of awaiting until the lower rotating pan is heated by the upper heat irradiator before cooking food as in the case of using the existing upstream heating cooker. Accordingly, a lot of electric charges are additionally produced due to a delay in time that may occur by doing an unnecessary operation of awaiting until the lower rotating pan is heated by the upper heat irradiator before cooking food. In addition, consumers use a method of roasting food while turning over the food that is similar to a unidirectional heating cooker such as the conventional upstream heating cooker at an initial cooking time during cooking due to a time difference occurs in a cooking time taken to roast the upper and lower portions of meat, even in the bidirectional radiation cooker, and may feel uncomfortable at the initial cooking time because of awaiting until the lower rotating pan is heated by the upper heat irradiator before cooking food as in the case of using the existing upstream heating cooker.

DISCLOSURE OF THE INVENTION

To solve the above problems of the conventional infrared ray radiation cooker as well as those of the existing infrared ray cooking appliance disclosed in Korean Patent Registration No. 833966, it is an object of the present invention to provide a bidirectional heating cooker further including a lower heating unit that is placed at the lower end of a cooking pan that is heated by radiant heat irradiated by an infrared lamp and that directly heats the cooking pan, to thereby heat the cooking pan quickly by the lower heating unit to thus make food such as meat put on the cooking pan quickly roasted and reduce a burden of electric charges based on a shortened heating time of the cooking pan, and to thereby make meat evenly without turning over the meat put on the cooking pan by an upper heating unit with the infrared lamp and the lower heating unit that is placed on the cooking pan, to thus make it possible for several persons who sit around and persons who want to eat fast food to eat the food conveniently.

To accomplish the above object of the present invention, there is provided a bidirectional heating cooker comprising:

a base frame that forms a lower framework;

a supporting pillar that is vertically placed at the center of the upper surface of the base frame;

a cooking pan that is separably placed on an upper portion of the base frame, and at the center of which a center hole through which the supporting pillar passes is formed;

a cover that is provided at the upper end of the supporting pillar;

an upper heating unit that is placed on the lower portion of the cover and emits radiant heat toward the cooking pan; and a lower heating unit that is provided at the lower end of the cooking pan and transfers heat directly to the cooking pan, wherein the cooking pan is heated by radiant heat irradiated from the upper heating unit and is directly heated by the lower heating unit, and both lower and upper portions of food are simultaneously roasted by radiant heat irradiated from the upper heating unit and by direct heating of the lower heating unit.

BRIEF DESCRIPTION OF THE DRAWINGS

The above and other objects and advantages of the present invention will become more apparent by describing the preferred embodiments thereof in detail with reference to the accompanying drawings in which.

BEST MODE FOR CARRYING OUT THE INVENTION

Hereinbelow, a bidirectional heating cooker according to preferred embodiments of the present invention will be described in more detail with reference to the accompanying drawings.

Figure 1:
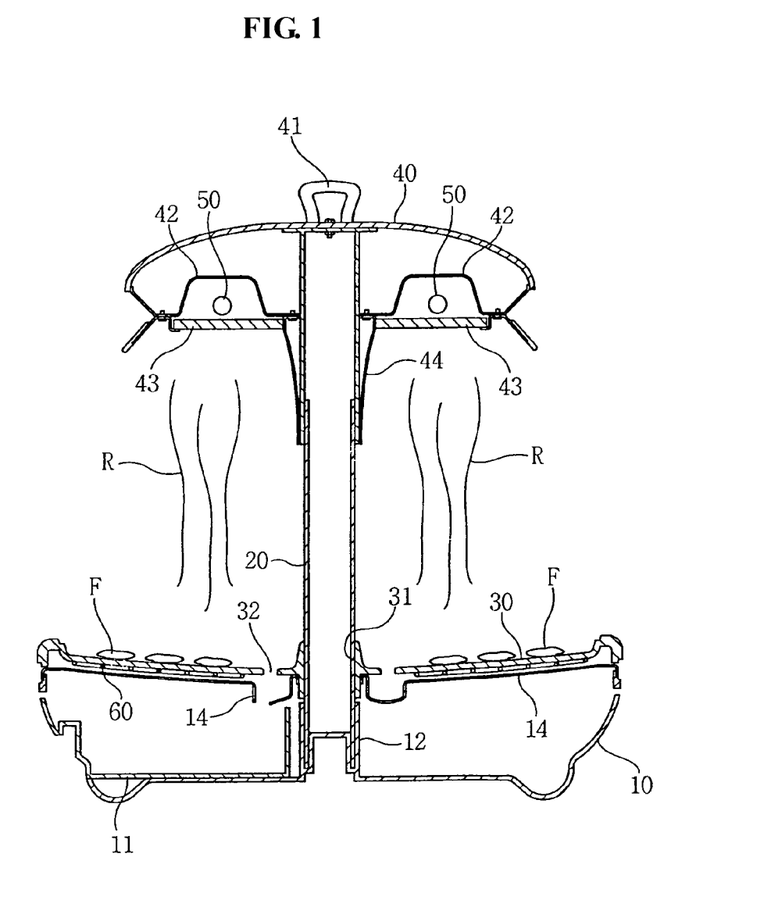
FIG. 1 is a cross-sectional view of a bidirectional heating cooker according to an embodiment of the present invention.
Figure 2:
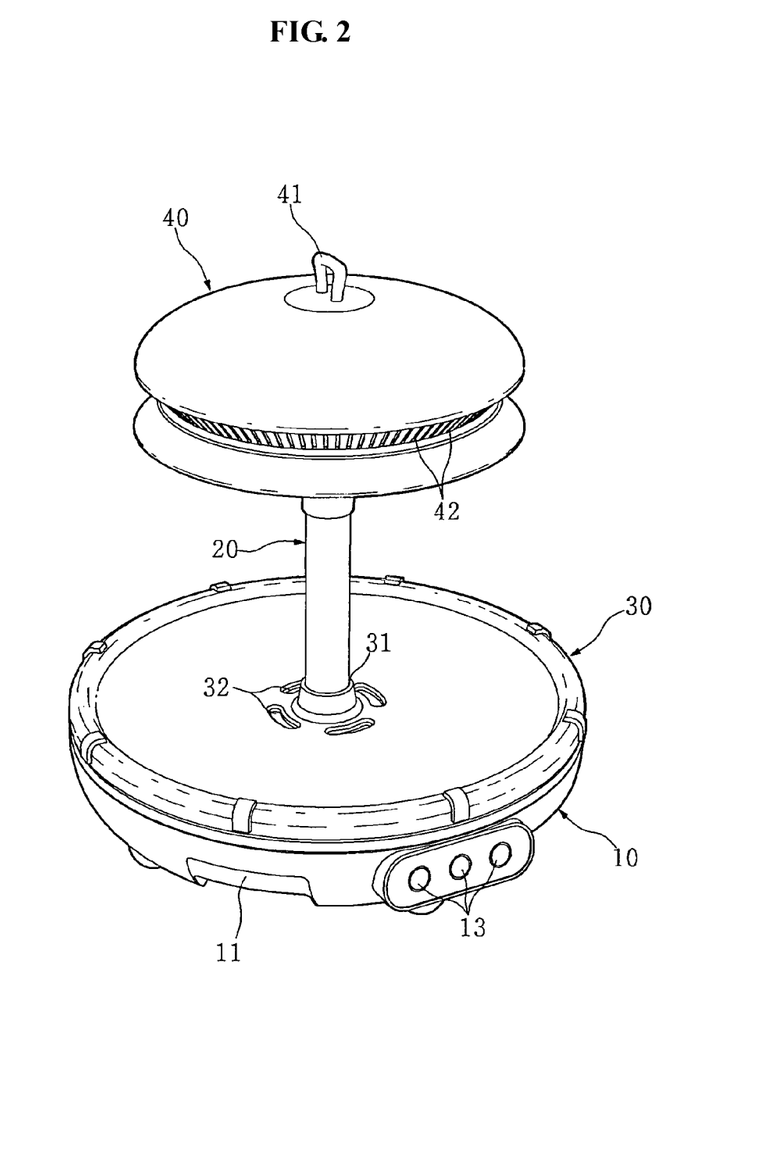
FIG. 2 is a perspective view of the bidirectional heating cooker according to the present invention.
Figure 3:
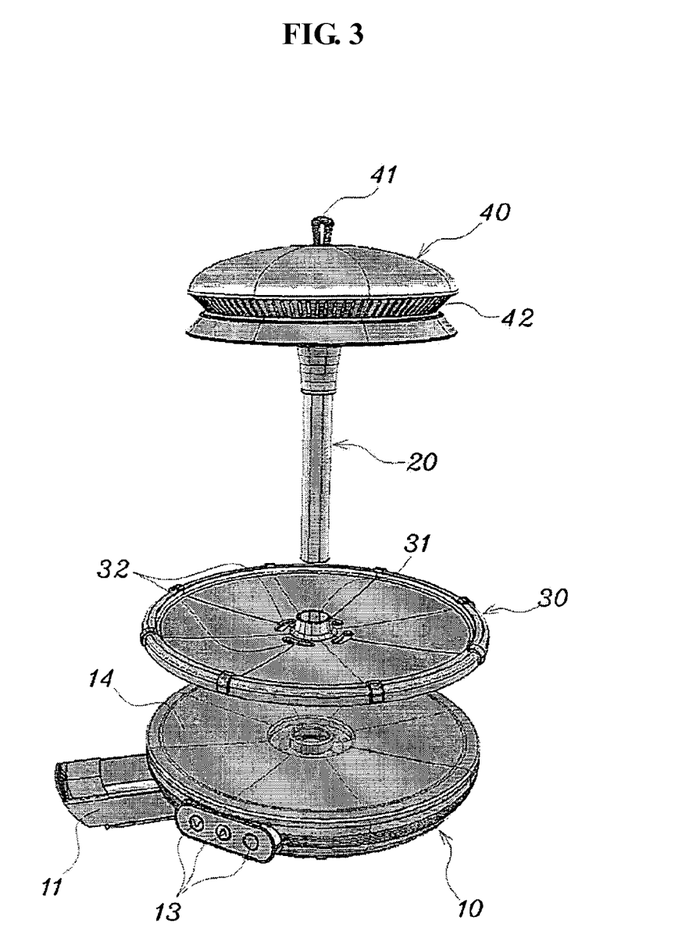
FIG. 3 is a separated perspective view of the bidirectional heating cooker according to the present invention.

FIG. 1 is a cross-sectional view of a bidirectional heating cooker according to an embodiment of the present invention. FIG. 2 is a perspective view of the bidirectional heating cooker according to the present invention. FIG. 3 is a separated perspective view of the bidirectional heating cooker according to the present invention.

Referring to FIGS. 1 through 3, a bidirectional heating cooker according to an embodiment of the present invention includes: a base frame 10 that forms a lower framework; a supporting pillar 20 that is vertically placed at the center of the upper surface of the base frame 10; a cooking pan 30 that is separably placed on an upper portion of the base frame 10, and at the center of which a center hole 31 through which the supporting pillar 20 passes is formed; a cover 40 that is provided at the upper end of the supporting pillar 20; an upper heating unit 50 that is placed on the lower portion of the cover 40 and emits radiant heat toward the cooking pan 30; and a lower heating unit 60 that is provided at the lower end of the cooking pan 30 and transfers heat directly to the cooking pan 30.

Thus, the cooking pan 30 is heated by radiant heat "R" irradiated from the upper heating unit 50 and is directly heated by the lower heating unit 60, and both lower and upper portions of food "F" are simultaneously roasted by radiant heat "R" irradiated from the upper heating unit 50 and by direct heating of the lower heating unit 60.

The base frame 10 is a lower structure that contacts the ground and entirely supports the bidirectional heating cooker according to the present invention. Preferably, the base frame 10 includes an accommodation space therein. In addition, as necessary, a support protrusion 12 into which the supporting pillar 20 is inserted is formed at the center of the lower surface of the base frame 10, and a switch 13 that controls electric power is formed at one side thereof.

In addition, the supporting pillar 20 is vertically placed at the center of the upper surface of the base frame 10, and for example is fitted with or screw-engaged with the support protrusion 12. A pressing unit 44 is further provided on the outer surface of the supporting pillar 20 in which the upper portion of the pressing unit 44 is combined in the inside of the cover 40 so as to make the supporting pillar 20 firmly at the time of adjusting height of the supporting pillar 20.

Accordingly, height of the supporting pillar 20 can be adjusted. Although it is not shown in the drawings, the supporting pillar 20 may be configured to have an outer supporting pillar whose diameter is large and an inner supporting pillar whose diameter is small in order to adjust height of the supporting pillar 20. The inner supporting pillar is inserted into the outer supporting pillar so as to escalate therein. Then, a fixing screw is provided on the outer supporting pillar to thus adjust height of the supporting pillar. Otherwise, a separate supporting unit is provided in the inside of the outer supporting pillar, to thus freely adjust height of the supporting pillar. That is, in order to make an upper heat emission function more strongly, the supporting pillar is made to escalate down during cooking. During eating, the supporting pillar is made to escalate up to make people eat food comfortably.

In addition, height of the supporting pillar 20 can be adjusted manually, or can be automatically adjusted by an electric motor.

The cooking pan 30 is a circular container on the upper surface of which food "F" is contained or put. The cooking pan 30 is separably placed on an upper portion of the base frame 10. A center hole 31 through which the supporting pillar 20 passes is formed at the center of the cooking pan 30. Preferably, oil discharge holes 32 are formed in the vicinity of the center hole 32 of the cooking pan 30. Here, oil containing grooves 11 and oil guide plates 14 are formed in the inside of the base frame 10 below the oil discharge holes 32.

The oil guide plates 14 play a role of collecting oil that falls down through the oil discharge holes 32 and guiding the oil into the oil containing grooves 11, respectively. Oil guide grooves (not shown) may be formed on the upper surface of the cooking pan 30 to thereby make oil fall down well.

In the case of the bidirectional heating cooker according to an embodiment of the present invention, the cooking pan 30 that is suitable to roast food "F" such as pork, beef or fish has been illustrated. However, a cooking pan that is suitable to boil food "F" such as a pot stew or beef with vegetable cooked in casserole may be provided according to another embodiment of the present invention.

Meanwhile, the cover 40 of a mushroom or umbrella form is formed on top of the supporting pillar 20. In one embodiment of the present invention, the cover 40 is integrally formed with the supporting pillar 20, and is separated from the base frame 10. However, in another embodiment of the present invention, the supporting pillar 20 is integrally formed with the base frame 10 and the cover 40 is separated from the supporting pillar 20. In addition, the cooking pan 30 is separated from the bidirectional heating cooker and is separated simultaneously when the supporting pillar 20 is separated from the bidirectional heating cooker. If the supporting pillar 20 is integrally formed in the bidirectional heating cooker, part of the cooking pan 30 is formed to include part of the supporting pillar 20, to make the supporting pillar part of the cooking pan 30 separably inserted into the other part of the supporting pillar 20.

In the drawings, a reference numeral 41 denotes a grip that allows a user to grasp the cover 40 easily.

In addition, the upper heating unit 50 is provided below the cover 40. In this invention, any heating unit that emits radiant heat "R" that can heat the cooking pan 30 hot can be used as the upper heating unit 50. In particular, it is preferable to use a heating unit that emits a massive amount of infrared rays or far-infrared rays. For example, any one of a far-infrared lamp, an infrared lamp, a halogen lamp, and a coil type filament may be used as the upper heating unit 50. In addition, a ceramic heater, a carbon heater, a quartz tube heater, a titanium heater, or a charcoal fire may be used as the upper heating unit 50.

It is preferable that a reflector 42 is provided between the cover 40 and upper heating unit 50. The reflector 42 plays a role of performing a function of intercepting radiant heat "R" and light that is emitted from the heating unit 50 from being scattered to other places, and furthermore gathering the radiant heat "R" onto the cooking pan 30. In addition, a protective film 43 such as a heat-resistant glass plate, a metallic perforations plate, or a metallic net is provided below the heating unit 50. The protective film 43 protects the upper heating unit 50, prevents the upper heating unit 50 from being polluted by oil etc., and avoids consumers from being damaged due to breakage of the hot heating unit that may happen at use.

In addition, a lower heating unit 60 that directly heats the cooking pan 30 is provided in the lower portion of the cooking pan 30. As illustrated, the lower heating unit 60 may be formed of an electric heat wire that is wound in the lower portion of the cooking pan 30. Besides, the lower heating unit 60 may be formed of an electric heat film or electric heat coating unit. Further, other heating units that are similar to the above-described heating units may be applied as the lower heating unit 60.

In the case of the bidirectional heating cooker according to this invention, it is convenient to form the supporting pillar 20, the cover 40 and the upper heating unit 50 as an integral single body, and form the base frame 10 and the cooking pan 30 in a separated form, respectively. By doing so, if the supporting pillar 20 is separated from the base frame 10, the cooking pan 30 can be easily separated from the entire bidirectional heating cooker so as to be replaced by another one or washed. However, the base frame 20 and the supporting pillar 20 may be formed as an integral single body. In this case, the cooking pan 30 may be formed in a manner that the cooking pan 30 is cut by thickness of the base frame 20. Here, a groove that is produced in the cooking pan 30 is fitted with a separate auxiliary cooking pan during using the bidirectional heating cooker.

In addition, heat that is applied to the cooking pan 30 from the upper heating unit 50 can be controlled by adjusting height of the supporting pillar 20, or controlled by using an electric switch 13. In the bidirectional heating cooker having the above-described structure, the cooking pan 30 and food "F" that is put on the cooking pan 30 are heated by radiant heat "R" irradiated from the upper heating unit 50 and are further quickly heated by directly heating the cooking pan 30 by the lower heating unit 60 that is provided in the lower portion of the cooking pan 30.

Accordingly, in comparison with the conventional art that the cooking pan 30 is simply heated by radiant heat "R" irradiated from an infrared lamp, the bidirectional heating cooker according to the present invention can heat the cooking pan quickly, to thereby reduce a heating time that is taken to heat the cooking pan by directly heating the cooking pan with the lower heating unit as well as heating the cooking pan with the radiant heat "R" and to thus reduce waste of electric charges, and roast food "F" such as meat quickly by fast heating the food "F." That is, both the upper and lower portions of food "F" that is put on the cooking pan 30 is bidirectionally heated by radiant heat "R" irradiated from the upper heating unit 50 and conduction heat of the lower heating unit 60, to thereby prevent consumers from frequently turning over the food "F" such as meat.

In addition, in the case of the bidirectional heating cooker according to the present invention, the cooking pan 30 can be rotated manually. Otherwise, the cooking pan can be rotated by a force of an electric motor.

Figure 4:
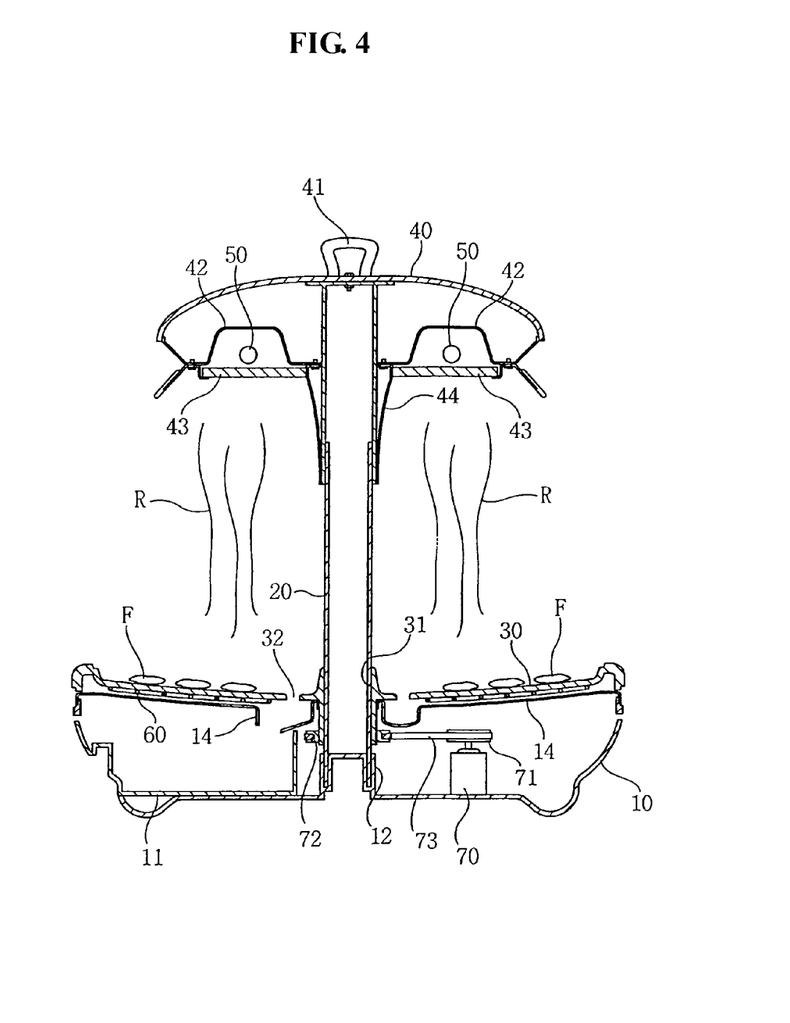
FIG. 4 is a cross-sectional view of a bidirectional heating cooker according to another embodiment of the present invention.
Figure 5:
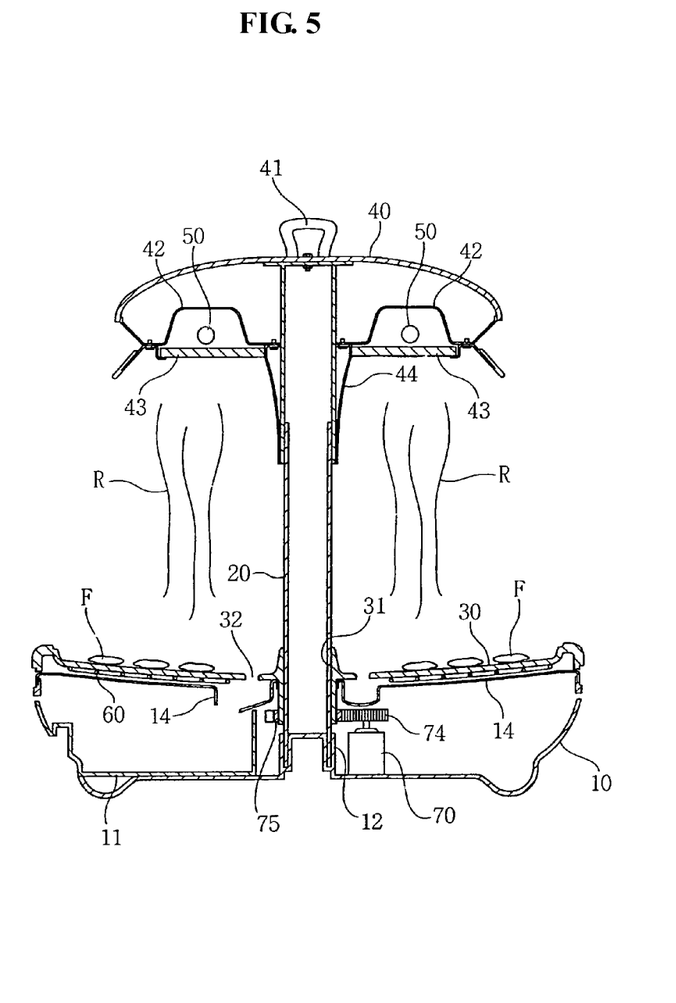
FIG. 5 is a cross-sectional view of a bidirectional heating cooker according to still another embodiment of the present invention.

FIG. 4 is a cross-sectional view of a bidirectional heating cooker according to another embodiment of the present invention. FIG. 5 is a cross-sectional view of a bidirectional heating cooker according to still another embodiment of the present invention.

As illustrated in FIGS. 4 and 5, an electric motor 70 is additionally provided in the base frame 10, and a rotating unit that is automatically rotated by the electric motor 70 to thus make the cooking pan 30 rotate.

As shown in FIG. 4, the rotating unit includes: a driving pulley 71 that is axially fitted with the electric motor 70; a rotating pulley 72 that is fitted with the lower end of the cooking pan 30; and a belt 73 that connects the driving pulley 71 and the rotating pulley 72.

Alternatively, as shown in FIG. 5, the rotating unit includes: a driving gear 74 that is axially fitted with the electric motor 70; and a rotating gear 75 that is tooth-engaged with the driving gear 74 and is fitted with the lower end of the cooking pan 30.

Accordingly, since the cooking pan 30 can be rotated, radiant heat "R" irradiated from the upper heating unit 50 is evenly transferred to food "F" to thus heat and roast the food "F" uniformly.

Figure 6A:
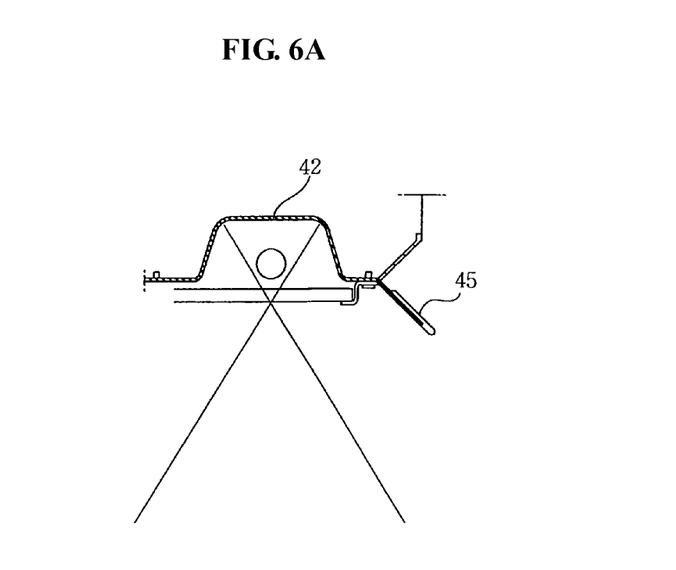
FIGS. 6A and 6B are cross-sectional views of a bidirectional heating cooker according to yet another embodiment of the present invention.
Figure 6B:
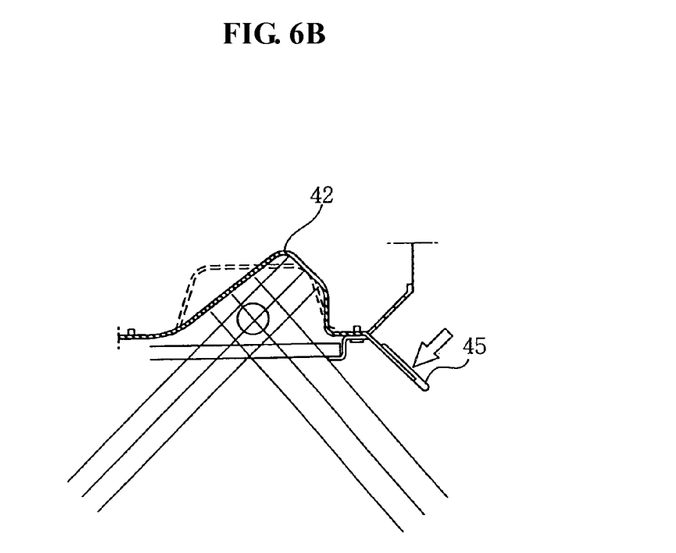

FIGS. 6A and 6B are cross-sectional views of a bidirectional heating cooker according to yet another embodiment of the present invention. As shown in FIGS. 6A and 6B, the bidirectional heating cooker according to yet another embodiment of the present invention further includes a reflector 42 that is formed between the cover 40 and the upper heating unit 50. In addition, the bidirectional heating cooker according to yet another embodiment of the present invention further includes a parabolic angle adjuster 45 that is formed at the outer side of the reflector 42 that is formed between the cover 40 and the upper heating unit 50, and is connected with one side of the reflector 42. Accordingly, one surface of the reflector 42 is steeply sloped by a pressing operation of the parabolic angle adjuster 45 to thereby extensively spread radiant heat emitted from the upper heating unit 50.

Therefore, a user may depress or may not depress the parabolic angle adjuster 45 according to height of the upper heating unit 50, to thereby establish an extensively spread range of radiant heat "R" emitted from the upper heating unit 50. As a result, since radiant heat "R" can be suitably transferred to the cooking pan 30 according to height of the cover 40, food can be cooked smoothly irrespective of height of the cover 40.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

EFFECTS OF THE INVENTION

A bidirectional heating cooker according to the present invention employs a bidirectional heating technology that upper and inner portions of food that is put on a cooking pan is roasted by radiant heat emitted in an upper heating unit, in particular, infrared radiant heat, and simultaneously the cooking pan is directly heated by a lower heating unit that is provided in the lower end of the cooking pan quickly, to thus make the lower portion of the food is directly roasted by conduction heat from the lower heating unit. Accordingly, since food does not need to be turned over frequently but can be roasted evenly without being burnt excessively, the bidirectional heating cooker according to the present invention is very suitable to roast meat such as pork or beef.

In addition, since the supporting pillar is provided at the center of the base frame and the cooking pan in the bidirectional heating cooker according to this invention, it is very convenient for several persons who sit around on one place to have various kinds of dining tables. In particular, since smoke or smell is hardly generated during cooking, the bidirectional heating cooker according to the present invention is very suitable for use in business places such as restaurants.

In addition, since the cooking pan is quickly heated by the lower heating unit, a heating time taken to heat the cooking pan can be shortened to thus greatly reduce electric charges.

The invention claimed is:

1. A bidirectional heating cooker comprising:
   a base frame that forms a lower framework;
   a supporting pillar that is vertically placed at the center of the upper surface of the base frame;
   a cooking pan that is separably placed on an upper portion of the base frame, and at the center of which a center hole through which the supporting pillar passes is formed;
   a cover that is provided at the upper end of the supporting pillar;
   an upper heating unit that is placed on the lower portion of the cover and emits radiant heat toward the cooking pan;
   a reflector that is formed between the cover and the upper heating unit; and
   a lower heating unit that is provided beneath the cooking pan and transfers heat directly to the cooking pan,
   wherein the cooking pan is heated by radiant heat irradiated from the upper heating unit and is directly heated by the lower heating unit, and both lower and upper portions of food are simultaneously roasted by radiant heat irradiated from the upper heating unit and by direct heating of the lower heating unit.

2. The bidirectional heating cooker according to claim 1, further comprising an electric motor that is provided in the inside of the base frame and a rotating unit that is rotated by the electric motor to rotate the cooking pan.

3. The bidirectional heating cooker according to claim 2, wherein the rotating unit comprises:
   a driving pulley that is axially fitted with the electric motor;
   a rotating pulley that is fitted to a lower end of the cooking pan; and
   a belt that connects the driving pulley and the rotating pulley.

4. The bidirectional heating cooker according to claim 2, wherein the rotating unit comprises: a driving gear that is axially fitted with the electric motor; and
   a rotating gear that is tooth-engaged with the driving gear and is fitted to a lower end of the cooking pan.

5. The bidirectional heating cooker according to claim 1, further comprising: oil discharge holes that are formed in the cooking pan; and oil containing grooves that are formed below the oil discharge holes.

6. The bidirectional heating cooker according to claim 1, wherein the upper heating unit is any one of a far-infrared lamp, an infrared lamp, a halogen lamp, a coil type filament, and a ceramic heater.

7. The bidirectional heating cooker according to claim 1, further comprising a parabolic angle adjuster that is formed at the outer side of the reflector that is formed between the cover and the upper heating unit, and is connected with one side of the reflector, wherein one surface of the reflector is sloped by a pressing operation of the parabolic angle adjuster to thereby extensively spread radiant heat emitted from the upper heating unit.

* * * * *